US011025103B2

(12) United States Patent
Nishikawa et al.

(10) Patent No.: US 11,025,103 B2
(45) Date of Patent: Jun. 1, 2021

(54) IRON CORE AND MOTOR

(71) Applicant: Panasonic Corporation, Osaka (JP)

(72) Inventors: Yukio Nishikawa, Osaka (JP); Naoki Nojiri, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 332 days.

(21) Appl. No.: 16/268,439

(22) Filed: Feb. 5, 2019

(65) Prior Publication Data

US 2019/0173328 A1 Jun. 6, 2019

Related U.S. Application Data

(63) Continuation of application No. PCT/JP2017/042978, filed on Nov. 30, 2017.

(30) Foreign Application Priority Data

Dec. 7, 2016 (JP) .............................. JP2016-237248

(51) Int. Cl.
| | | |
|---|---|---|
| *H02K 1/02* | (2006.01) | |
| *H02K 15/02* | (2006.01) | |
| *H02K 1/18* | (2006.01) | |
| *H02K 1/14* | (2006.01) | |
| *H01F 1/153* | (2006.01) | |
| *H01F 3/04* | (2006.01) | |
| *H01F 41/02* | (2006.01) | |

(52) U.S. Cl.
CPC ........... *H02K 1/02* (2013.01); *H01F 1/15333* (2013.01); *H01F 3/04* (2013.01); *H01F 41/0226* (2013.01); *H02K 1/146* (2013.01); *H02K 1/185* (2013.01); *H02K 15/02* (2013.01)

(58) Field of Classification Search
CPC .......... H02K 1/02; H02K 1/146; H02K 1/185; H02K 15/02; H01F 1/15333
USPC ................................................... 310/216.009
See application file for complete search history.

(56) References Cited

U.S. PATENT DOCUMENTS

| | | |
|---|---|---|
| 5,578,883 A | 11/1996 | Sakashita et al. |
| 5,803,988 A | 9/1998 | Bae et al. |
| 6,425,960 B1 | 7/2002 | Yoshizawa et al. |
| 7,235,910 B2 | 6/2007 | Decristofaro et al. |

(Continued)

FOREIGN PATENT DOCUMENTS

| | | |
|---|---|---|
| CN | 101552092 B | 11/2012 |
| CN | 102868241 A | 1/2013 |

(Continued)

OTHER PUBLICATIONS

The Extended European Search Report dated June Oct. 18, 2019 for the related European Patent Application No. 17877845.2.

(Continued)

*Primary Examiner* — Terrance L Kenerly
(74) *Attorney, Agent, or Firm* — McDermott Will and Emery LLP (57) ABSTRACT

An iron core including a laminate in which a plurality of nanocrystal thin strips are laminated, a board, and a fastener that fastens the laminate and the board, in which at least one of upper and lower surfaces of the laminate has a colored oxide film and an uncolored oxide film is used. Moreover, the iron core has a region of the colored oxide film wider than a region of the uncolored oxide film region is used. Furthermore, a motor uses the above-described iron core as a stator.

18 Claims, 5 Drawing Sheets

(56) References Cited

U.S. PATENT DOCUMENTS

2004/0085173 A1   5/2004   Decristofaro et al.
2004/0212269 A1   10/2004  Decristofaro et al.

FOREIGN PATENT DOCUMENTS

| EP | 2958116 A1 | 12/2015 |
|---|---|---|
| JP | 6-145917 | 5/1994 |
| JP | 7-015934 | 1/1995 |
| JP | 2004-353090 A | 12/2004 |
| JP | 2007-525818 | 9/2007 |
| WO | 1997/022723 | 6/1997 |

OTHER PUBLICATIONS

International Search Report of PCT application No. PCT/JP2017/042978 dated Jan. 16, 2018.
English Translation of Chinese Search Report dated Sep. 21, 2020 for the related Chinese Patent Application No. 201780051502.9.

IRON CORE AND MOTOR

TECHNICAL FIELD

The technical field relates to an iron core in which soft magnetic thin strips are laminated and a motor using the iron core as a stator.

BACKGROUND

As a laminate of magnetic plates in an iron core (stator) for a motor in the related art, pure iron or an electromagnetic steel plate is used. In motors aimed for higher efficiency, amorphous thin strips or thin strips having nanocrystal grains are used in some iron cores (for example, see Japanese Patent Unexamined Publication No. 6-145917).

A manufacturing process of a stator core disclosed in Japanese Patent Unexamined Publication No. 6-145917 is as follows. First, an amorphous alloy thin strip produced by a liquid quenching method such as a single roll method or a twin roll method is processed into a predetermined shape by a method such as winding, cutting, punching, and etching. Next, the processed product is formed by laminating.

SUMMARY

However, in order to make the amorphous alloy thin strip to be a nanocrystal thin strip which is supposed to have better soft magnetic characteristics, further heat treatment is required. Here, the thickness of the nanocrystal thin strip is about one-tenth of the thickness of a commonly used electromagnetic steel plate. Therefore, when the heat treatment is performed one by one, the handling amount is about ten times higher than the one in the related art.

As a result, in the heat treatment and a subsequent lamination process, there is a problem that about ten times productivity for obtaining the same laminated thickness is required compared to the case of the electromagnetic steel plate.

An object of the disclosure is to solve the problems in the related art, and to provide an iron core and a motor of nanocrystal thin strips with stable magnetic characteristics without impairing productivity.

In order to achieve the above-described object, an iron core including a laminate in which a plurality of nanocrystal thin strips are laminated, a board, and a fastener that fastens the laminate and the board, in which at least one of upper and lower surfaces of the laminate has a colored oxide film and an uncolored oxide film is used. Moreover, the iron core having a region of the colored oxide film wider than a region of the uncolored oxide film region is used. Furthermore, a motor using the above-described iron core as a stator is used.

According to the present configuration, since the nanocrystal thin strips obtained by performing heat treatment on the laminated amorphous alloy thin strips at once are laminated, it is possible to provide an iron core and a motor of nanocrystal thin strips with stable magnetic characteristics without impairing productivity.

According to the iron core and motor of the disclosure, it is possible to provide an iron core and a motor of nanocrystal thin strips with stable magnetic characteristics without impairing productivity.

DESCRIPTION OF EMBODIMENTS

Hereinafter, embodiments of the disclosure will be described with reference to the drawings.

Embodiment 1

Structure

Figure 1A:
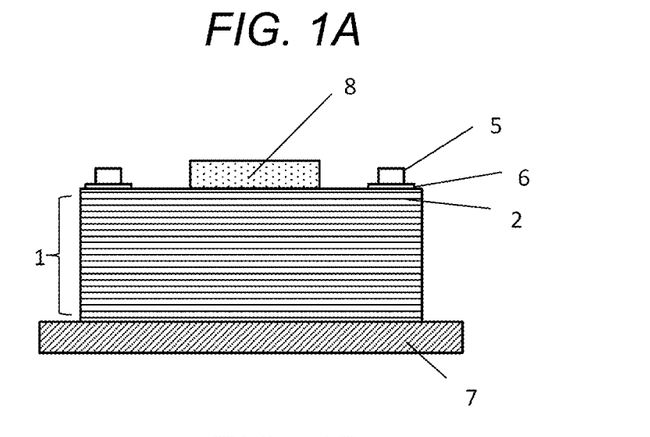
FIG. 1A is a side view of an iron core and a motor according to Embodiment 1 of the disclosure.
Figure 1B:
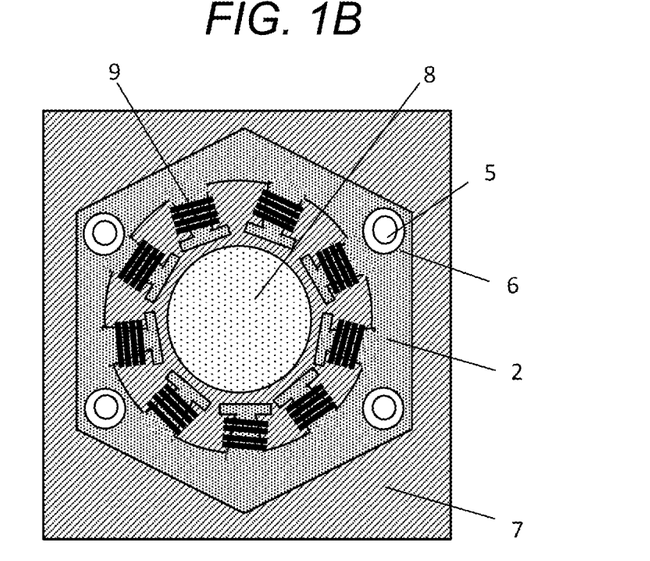
FIG. 1B is a top view of FIG. 1A.

FIGS. 1A and 1B are views showing a configuration of an iron core and a motor according to Embodiment 1 of the disclosure, specifically, a brushless motor. FIG. 1A is a side view of an iron core and a motor, and FIG. 1B is a top view.

As shown in FIGS. 1A and 1B, an iron core includes laminate 1 of nanocrystal thin strips 2 and a fastening mechanism composed of bolt 5 and fastener 6 penetrating laminate 1 and fastening them to metal board 7. The iron core to which winding 9 is applied is a stator. Rotor 8 is provided in an inner diameter portion of the stator, and the motor is driven by energizing.

Laminate 1 is an iron core member of the stator of the motor. Laminate 1 becomes laminate 1 of nanocrystal thin strips 2 by laminating nanocrystal thin strips 2 which are amorphous alloy thin strips without using an adhesive therebetween and subjecting them to heat treatment. A space factor can be increased by not using an adhesive. The amorphous alloy thin strip before the heat treatment is an iron alloy having a plate thickness of 10 μm to 60 μm and containing at least one of boron and silicon. The amorphous alloy thin strip is manufactured by quenching by pouring the melted iron alloy onto a surface of a rotating cooling drum and stretching it into a ribbon shape.

Manufacturing Process

Figure 2A:
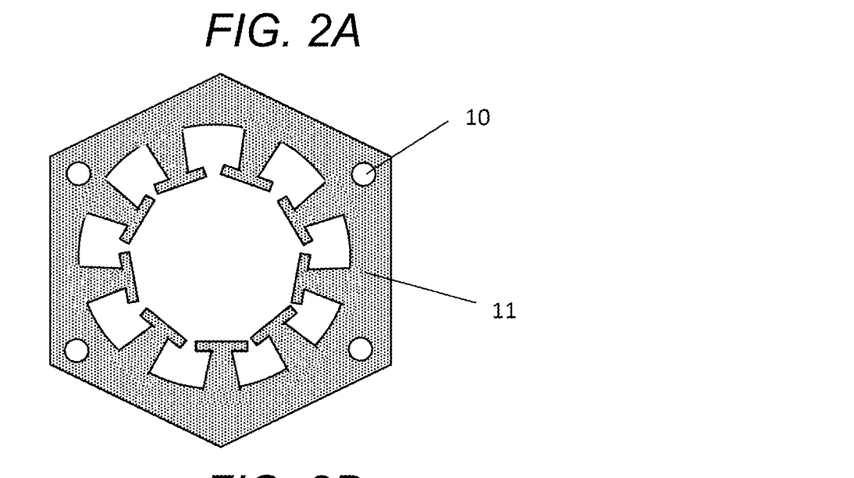
FIG. 2A is a view showing upper and lower surfaces of a laminate having mainly a visible oxide film according to Embodiment 1 of the disclosure.

When amorphous alloy thin strips prepared to have a predetermined weight or laminated thickness are laminated and heat treated, a region having visible oxide film 11 on almost the entire surface is obtained on at least one of upper and lower surfaces as shown in nanocrystal thin strip 2 of FIG. 2A.

However, due to the influence of components fixing the laminate, a region of invisible oxide film 12 showing metallic luster may remain in a vicinity of the site. A region of visible oxide film 11 is wider than the region of invisible oxide film 12.

Through-hole 10 is a through-hole for inserting bolt 5. Visible colors tend to obtain good magnetic characteristics in the range visible to bare eyes as shiny brown, blue, violet, and the like. However, there is no strict correlation between the color and magnetic characteristics.

Figure 2B:
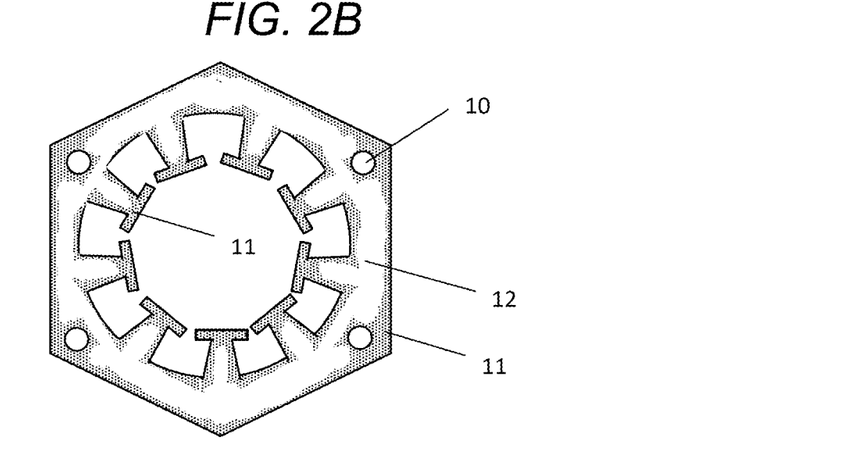
FIG. 2B is a view showing an interlayer surface of a laminate having mainly an invisible oxide film according to Embodiment 1 of the disclosure.

Nanocrystal thin strip 2 of FIG. 2B shows an interlayer surface of laminate 1. It has the region of invisible oxide film 12 showing metallic luster. Between the surfaces of nanocrystal thin strips 2, nanocrystal thin strips 2 come into contact with each other, or the gap between nanocrystal thin strips 2 becomes very narrow. Therefore, the atmosphere and the like can barely enter between the surfaces of nanocrystal thin strips 2. Therefore, as before the heat treatment, it is assumed that the region of invisible oxide film 12 showing metallic luster remains on the surface of nanocrystal thin strip 2.

"Visible" indicates that it is colored, which means that it is not metallic luster, white, black, or transparent. "Invisible" indicates that the above-mentioned coloring is not carried out.

Regarding the film thickness of the formed oxide film, a visible, that is, a colored oxide film and an invisible, that is, an uncolored oxide film have almost the same thickness.

In principle, a normal healthy person can know with bare eyes whether the oxide film is colored or not.

The outer periphery of the region of invisible oxide film 12 showing metallic luster is surrounded by the region of visible oxide film 11. It is considered that this is the influence of the atmosphere entering through a small gap between the layers of nanocrystal thin strips 2 because the outer periphery of nanocrystal thin strip 2 is close. Even if laminated nanocrystal thin strips 2 are heat treated, if the number of the pieces is the upper limit or lower, each of nanocrystal thin strips 2 obtains predetermined magnetic characteristics. When the number of pieces exceeds the upper limit, the difference in temperature distribution in the thickness direction increases, and thereby good magnetic characteristics cannot be obtained.

Accordingly, nanocrystal thin strips 2 on the surface of laminate 1 have mainly visible oxide film 11 on one side and mainly invisible oxide film 12 showing metallic luster on the other side.

Nanocrystal thin strips 2 inside laminate 1 have mainly invisible oxide film 12 showing metallic luster on both sides.

Single nanocrystal thin strip 2 of laminate 1 has mainly the visible oxide film on both sides.

Nanocrystal thin strips 2 of laminate 1 may include any one of above-described nanocrystal thin strips 2.

The heat generated by self-heating accompanied with crystallization is likely to be accumulated between laminated nanocrystal thin strips 2. Due to the excessive temperature rise, not only the magnetic characteristics are rather deteriorated, but also it becomes brittle and easily damaged. Although it depends on target magnetic characteristics and heat treatment conditions, good magnetic characteristics can be obtained even when ten or more nanocrystal thin strips 2 are laminated and heat treated.

A portion of the region is pressed by fastener 6 and heat treated without using an adhesive between nanocrystal thin strips 2, so that the heat treatment can be performed in a laminated state, and characteristics can be obtained.

Accordingly, processes such as heat treatment and lamination can be processed at once with ten or more pieces. Since the plate thickness of nanocrystal thin strip 2 is as thin as about one-tenth of an electromagnetic steel plate, there is a problem that the productivity deteriorates to about one-tenth when treated one by one. However, since ten or more pieces can be processed at once, this problem can be solved. Therefore, it is possible to manufacture laminate 1 of nanocrystal thin strips 2 with stable magnetic characteristics without impairing the productivity.

Embodiment 2

Figure 3A:
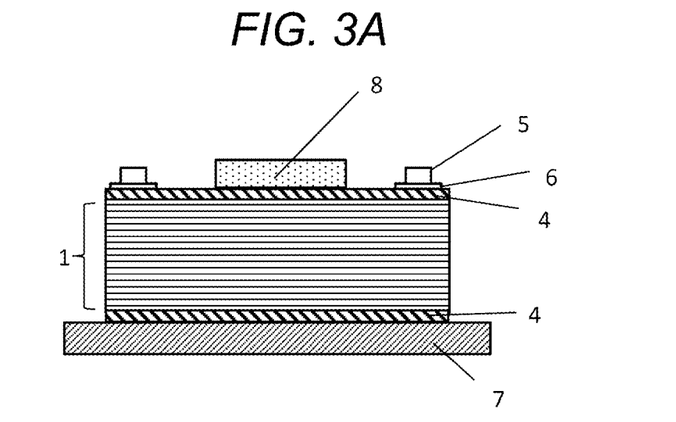
FIG. 3A is a side view of an iron core and a motor according to Embodiment 2 of the disclosure.
Figure 3B:
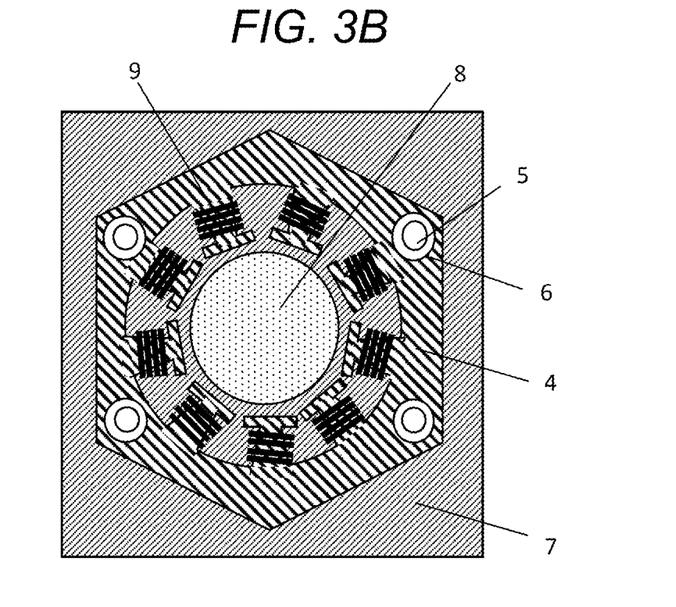
FIG. 3B is a top view of FIG. 3A.

FIGS. 3A and 3B are views showing configurations of an iron core and a motor according to Embodiment 2 of the disclosure. FIG. 3A is a side view of the iron core and motor, and FIG. 3B is a top view. FIGS. 3A and 3B are different from Embodiment 1 in that metal plate 4 is provided between laminate 1 in which nanocrystal thin strips 2 are laminated, and bolt 5 and fastener 6 which is a washer.

Since nanocrystal thin strip 2 is brittle, when the same soft magnetic material electromagnetic steel plate is used for metal plate 4, nanocrystal thin strip 2 can be protected from the fastening force from bolt 5 and fastener 6, the tightening force of winding 9, or other external forces.

As another material for metal plate 4, as long as it is a nonmagnetic material, any materials not affecting the magnetic characteristics of the iron core can be used. In FIGS. 3A and 3B, although metal plate 4 is provided above and below laminate 1, either one may be provided as long as the object can be achieved.

In a case where one or a plurality of nanocrystal thin strips 2 are used instead of laminate 1, metal plate 4 is provided on the surface thereof.

Embodiment 3

Figure 4:
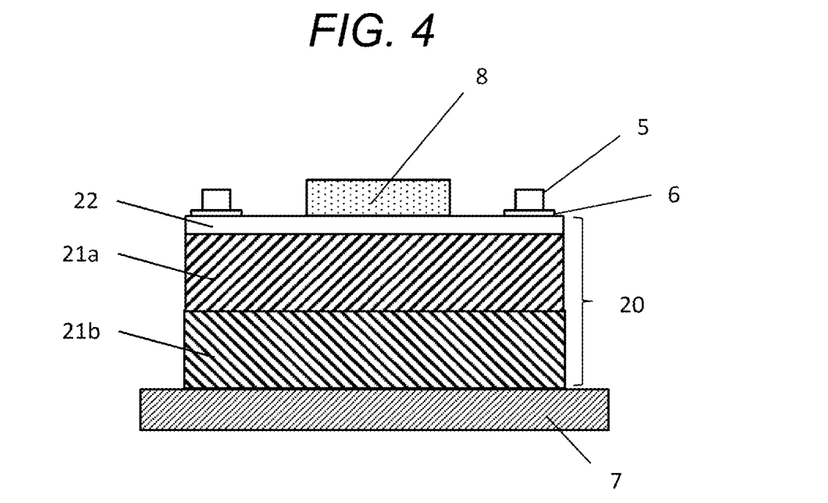
FIG. 4 is a side view of an iron core and a motor according to Embodiment 3 of the disclosure.

FIG. 4 is a side view of an iron core and a motor according to Embodiment 3 of the disclosure. FIG. 4 is different from Embodiment 1 in that the entire laminated portion 20 has a three-stage structure in which same two first laminates 21a and 21b having a predetermined number of nanocrystal thin strips 2 and second laminate 22 having a smaller number of predetermined pieces are laminated.

When nanocrystal thin strips 2 are heat treated, it is difficult to secure temperature uniformity in the lamination direction when the number of laminated nanocrystal thin strips 2 increases, so that the width of the distribution of various magnetic characteristics increases between nanocrystal thin strips 2. Therefore, there is a limit in the laminated thickness of nanocrystal thin strips 2, and the heat treatment is performed for each laminate having a predetermined number of laminated pieces.

Therefore, laminated portion 20 is formed by laminating a plurality of laminates.

In a case where the thickness of laminated portion 20 is thicker than a single laminate, one or plurality of laminates are laminated. The lamination amount of nanocrystal thin strip 2 in laminated portion 20 is controlled by the weight or the thickness at the time of fastening. Strictly speaking, since each nanocrystal thin strip 2 has different plate thicknesses, it is difficult to keep the thickness to be constant in controlling the number of laminated pieces.

In FIG. 4, first, two first laminates 21a and 21b are laminated and the weight is measured. After confirming that the weight when another first laminate 21a or first laminate 21b is laminated exceeds a predetermined weight, second laminate 22 having less number of pieces than first laminate 21a and first laminate 21b is laminated to adjust the difference in weight. Since various values are generated in difference in weight, a plurality of laminates having different numbers of pieces or weights are prepared in advance, and second laminate 22 having an appropriate weight is laminated according to the difference in weight. In the case of thickness control, the difference in thickness can be adjusted similarly.

Second laminate 22 having a smaller number of nanocrystal thin strips 2 than first laminate 21a, 21b having a larger number of nanocrystal thin strips 2 has a smaller number of pieces, so a more uniform heat treatment can be performed. Therefore, the magnetic characteristics are more stable. As a result, second laminate 22 not only can adjust the difference in weight and thickness but also stabilizes the magnetic characteristics.

As in FIGS. 3A and 3B, metal plate 4 may be provided between laminated portion 20 and a fastener including bolt 5 and fastener 6.

Adhesive

Figure 5A:
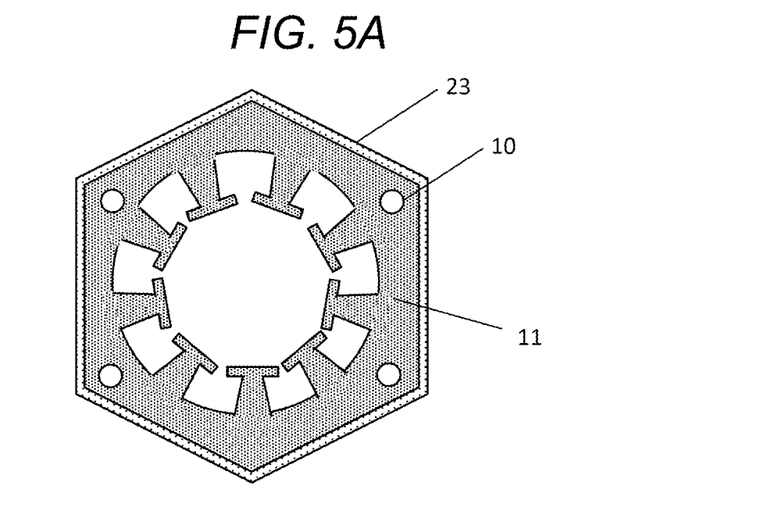
FIG. 5A is a top view of a bonded laminate according to Embodiment 3 of the disclosure.
Figure 5B:
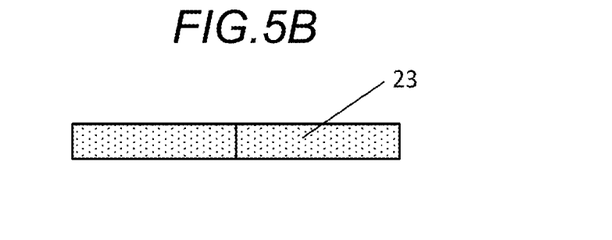
FIG. 5B is a side view of FIG. 5A.

FIG. 5A is a top view of first laminate 21 or second laminate 22, and FIG. 5B is a side view. Adhesive 23 is applied to the outer periphery of first laminate 21 and second laminate 22 and cured. An objective of providing adhesive 23 is to integrate first laminate 21 or second laminate 22 so that it can be easily handled. Therefore, as long as the integration can be secured, the bonding place may bond the entire outer periphery as shown in FIGS. 5A and 5B, partially bond the outer periphery, bond other inner portion such as a laminated end surface, or bond between layers of nanocrystal thin strip. The amorphous alloy thin strip may be bonded first to form first laminate 21 and second laminate 22, and then heat treatment may be performed, or nanocrystal thin strip 2 may be laminated and bonded.

However, bonding between layers of the amorphous alloy thin strip causes disadvantages such as lowering the space factor, deteriorating heat conduction in the lamination direction during the heat treatment, increasing the width of distribution of the magnetic characteristics between nanocrystal thin strips 2, or requiring materials and time for interlayer bonding.

There is no particular restriction on the kind of adhesive 23. However, since it is often heated to 350° C. or higher by the heat treatment, a polyimide-based adhesive with high heat resistance is desirable. When an adhesive with low heat resistance temperature such as an epoxy-based adhesive is used, the thermal history remains in the adhesive. A room temperature curing type or ultraviolet curing type adhesive may be used.

Embodiment 4

Figure 6A:
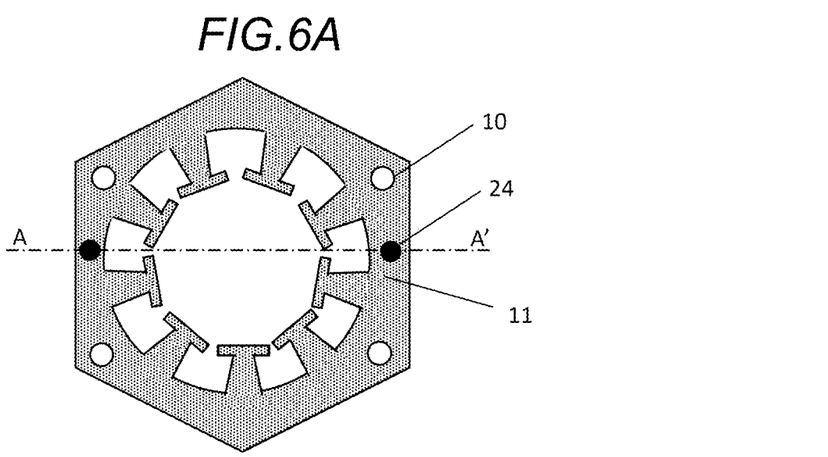
FIG. 6A is a top view of a mechanically fastened laminate according to Embodiment 4 of the disclosure.
Figure 6B:
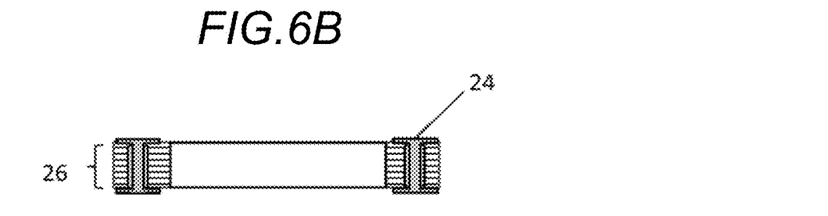
FIG. 6B is a cross-sectional view taken along line A-A' of FIG. 6A.

FIG. 6A is a top view of a mechanically fastened laminate according to Embodiment 4 of the disclosure, and FIG. 6B is a cross-sectional view taken along line A-A' of FIG. 6A. FIGS. 6A and 6B are different from Embodiment 3 in that two portions are fixed by caulking member 24. The bonding causes disadvantages such as the magnetic characteristics being affected by other than the heat treatment due to the heating for curing or long treatment time for curing. However, when mechanical means such as caulking is used, there is an advantage that it can be fixed in a short time of crushing at room temperature. Besides caulking, the mechanical fastening method may be eyelets or a mechanism sandwiching the laminated end surface.

Embodiment 5

Figure 7:
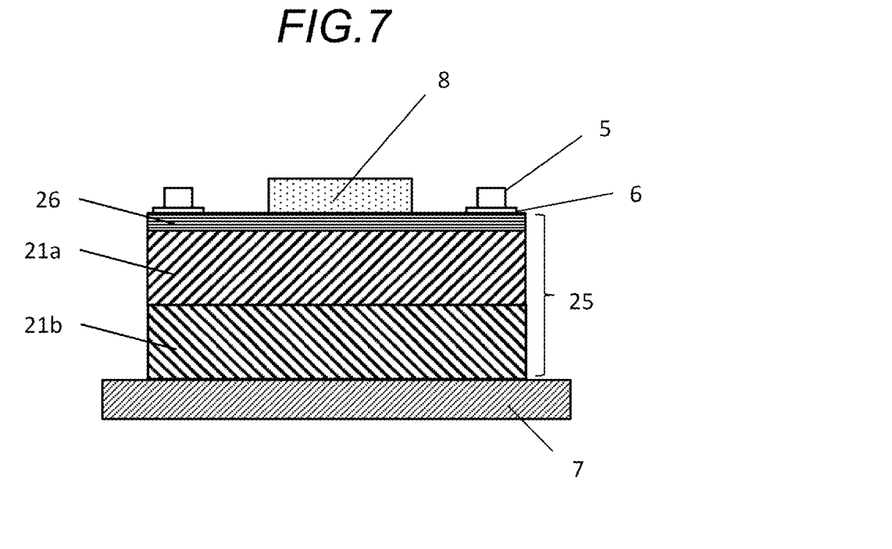
FIG. 7 is a side view of an iron core and a motor according to Embodiment 5 of the disclosure.

FIG. 7 is a side view of an iron core and a motor according to Embodiment 5 of the disclosure. FIG. 7 is different from FIG. 4 of Embodiment 3 in that laminated portion 25 is formed by laminating two first laminates 21a and 21b having the same number of laminated nanocrystal thin strips 2 and layer 26 in which nanocrystal thin strips are laminated one by one instead of taking the form of a laminate in which nanocrystal thin strips 2 are fixed.

As described in FIG. 4, the lamination amount of nanocrystal thin strips 2 in laminated portion 25 is controlled by the weight or the thickness at the time of fastening. In FIG. 7 as well, first laminates 21a and 21b are laminated and the weight is measured first, and the difference in weight is adjusted by laminating nanocrystal thin strips 2 one by one. Therefore, the number of laminated layers 26 in which the nanocrystal thin strips are laminated is from one or more to less than the number of laminated layers of first laminates 21a and 21b.

However, in a case where the plate thickness is thin, the number of pieces maybe larger than first laminates 21a and 21b. Nanocrystal thin strips 2 to be added may be heat treated one by one in separate process or may be taken one by one from first laminates 21a and 21b before the fixation and laminated. Nanocrystal thin strips 2 heat treated one by one are in a state having mainly visible oxide film 11 shown in FIG. 2A on both sides. There are two kinds of appearance of nanocrystal thin strip 2 in the case of extracting first laminates 21a and 21b before the fixation. One kind has one surface in a state shown in FIG. 2A and the other surface in a state having mainly invisible oxide film 12 showing metallic luster shown in FIG. 2B. Both sides are in the state of FIG. 2B in the other kind. Accordingly, layer 26 in which the nanocrystal thin strips are laminated, including any one kind or two or more kinds of these three kinds of nanocrystal thin strips is formed.

As in FIGS. 3A and 3B, metal plate 4 may be provided between laminated portion 25 and a fastener including bolt 5 and fastener 6.

As a Whole

Embodiments 1 to 5 can be combined.

The iron core according to the disclosure is useful as a stator of a motor. Furthermore, the iron core according to the disclosure can also be applied to applications of electronic components such as transformers, other than motors.

REFERENCE SIGNS LIST

1 LAMINATE
2 NANOCRYSTAL THIN STRIP
4 METAL PLATE
5 BOLT
6 FASTENER
7 METAL BOARD
8 ROTOR
9 WINDING
10 THROUGH-HOLE
11 VISIBLE OXIDE FILM
12 INVISIBLE OXIDE FILM
20 LAMINATED PORTION
21a,21b FIRST LAMINATE
22 SECOND LAMINATE
23 ADHESIVE
24 CAULKING MEMBER
25 LAMINATED PORTION
26 LAMINATED LAYER IN WHICH NANOCRYSTAL THIN STRIPS ARE LAMINATED

What is claimed is:

1. An iron core comprising:
a laminate in which a plurality of nanocrystal thin strips are laminated;
a board; and
a fastener that fastens the laminate and the board,
wherein at least one of upper and lower surfaces of the laminate has a colored oxide film and an uncolored oxide film.

2. The iron core of claim 1,
wherein a region of the colored oxide film is wider than a region of the uncolored oxide film.

3. The iron core of claim 1,
wherein, in surfaces between the plurality of nanocrystal thin strips, the uncolored oxide films are present more than the colored oxide films.

4. The iron core of claim 1,
wherein the plurality of nanocrystal thin strips have mainly a colored oxide film one side and mainly an uncolored oxide film showing metallic luster on an other side.

5. The iron core of claim 1,
wherein the nanocrystal thin strips of the laminate have mainly an uncolored oxide film showing metallic luster on both sides.

6. The iron core of claim 1,
wherein the nanocrystal thin strips of the laminate have mainly a colored oxide film on both sides.

7. The iron core of claim 1, further including:
two or more kinds of a nanocrystal thin strip which has mainly a colored oxide film on both sides, a nanocrystal thin strip which has mainly an uncolored oxide film showing metallic luster on both sides, and a nanocrystal thin strip which has mainly a colored oxide film on one side and mainly an uncolored oxide film showing metallic luster on an other side.

8. The iron core of claim 1,
wherein a metal plate is provided between the laminate and the board or between the laminate and the fastener.

9. The iron core of claim 1,
wherein the laminate includes a plurality of laminates.

10. The iron core of claim 9,
wherein the plurality of laminates have a different number of the nanocrystal thin strips.

11. The iron core of claim 9,
wherein the plurality of laminates include one piece of the nanocrystal thin strips.

12. The iron core of claim 1,
wherein the laminate is integrated by a fixing means.

13. The iron core of claim 12, wherein the fixing means is an adhesive.

14. The iron core of claim 13,
wherein the adhesive is applied to a laminated end surface of the laminate.

15. The iron core of claim 13,
wherein the adhesive undergoes thermal history.

16. The iron core of claim 12,
wherein the fixing means is a mechanical fastening mechanism.

17. The iron core of claim 1,
wherein a metal plate is provided on the laminate or at least one of uppermost and lowermost outer layers of the nanocrystal thin strips.

18. A motor which uses the iron core of claim 1 as a stator.

* * * * *